Patented Nov. 7, 1922.

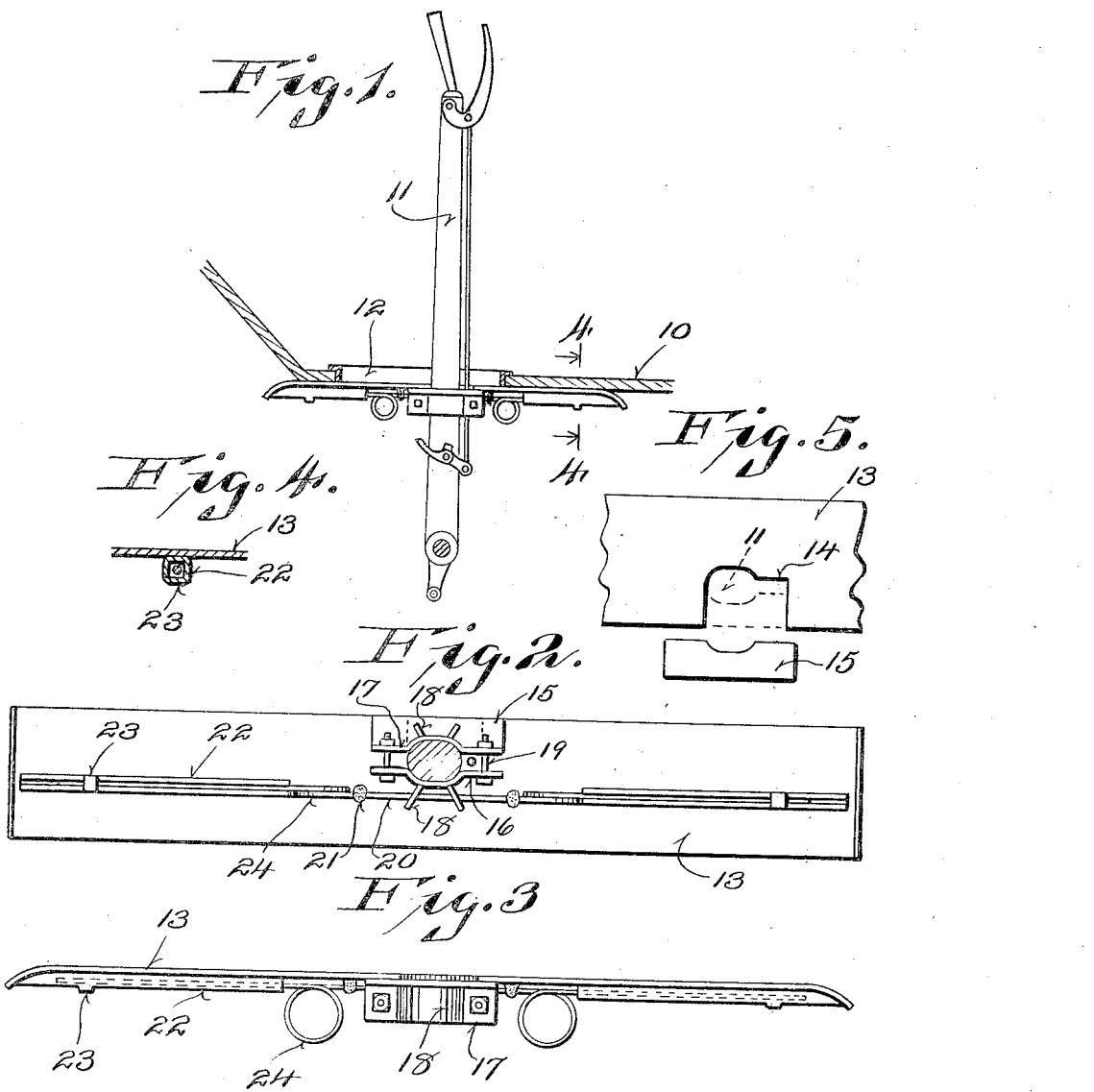

1,434,813

UNITED STATES PATENT OFFICE.

CHARLES H. GAULKE, OF MILWAUKEE, WISCONSIN.

SLOT GUARD FOR AUTOMOBILE LEVERS.

Application filed March 21, 1922. Serial No. 545,523.

*To all whom it may concern:*

Be it known that I, CHARLES H. GAULKE, a citizen of the United States, and resident of Milwaukee, in the county of Milwaukee and State of Wisconsin, have invented certain new and useful Improvements in Slot Guards for Automobile Levers; and I do hereby declare that the following is a full, clear, and exact description thereof.

My invention relates to a slot guard which is adapted to be secured to an automobile control lever, or the like, underneath the floor.

A general object of the invention is to provide a device of this kind which will effectively cover the slot in which the lever operates in all positions of the latter to protect the interior of the automobile from cold air in the winter and from dust and dirt in the summer.

It is, also, an object of the invention to provide a guard which may be cheaply manufactured and which may be easily and quickly attached to the control lever of any type of automobile, or to any other lever which operates in a similar manner.

With the above and other objects in view, the invention consists in certain details of construction and combinations of elements, which will be described in connection with the accompanying drawings and subsequently claimed.

In the drawing:—

Figure 1 represents a longitudinal, sectional view taken through the floor of an automobile and showing my invention attached thereto.

Figure 2 is a bottom plan view of the invention.

Figure 3 is a side elevation thereof.

Figure 4 is a detail sectional view on the line 4—4 of Figure 1, and

Figure 5 is a fragmentary view showing the manner of attaching the invention to the lever.

Referring in detail to the drawing, the numeral 10 designates the floor of an automobile and 11 the lever to which my invention is applied, which, in the present instance, is illustrated as the emergency brake lever which extends upwardly through a slot 12 in the floor.

My invention comprises a comparatively long, rectangular strip 13, preferably of heavy sheet metal which has one side cut out, as shown at 14, substantially mid-way between the ends. This cut-out is so shaped as to fit around one side of the lever 11 and after the same is placed around the lever, a small cover strip 15 is inserted on the other side of the lever so as to complete the cover. The remaining part of the cut-out portion and the two strips together thus completely cover the slot 12 in which the lever operates.

The two strips are formed with complementary flanges 16 and 17 which are preferably reinforced and held in position perpendicular to the main portions of the strips by suitable flanges 18. In attaching the device to the lever the strips are inserted around the same closely against the under side of the floor and are secured in place by means of bolts 19, or the like, which clamp the flanges 16 and 17 to the lever.

In order to maintain the under portions of the guard against the floor in all positions of the lever, a resilient rod 20 is secured longitudinally thereto by means of solder 21, or equivalent fastening means. The outer ends of the guard are reinforced by strips 22 which may be in the form of a channel, as shown in Figure 4, and held in shape by a cleat 23. The channels 22 thus serve not only to reinforce the outer portions of the guard, but also to form a guideway in which the ends of the rod 20 are slidably held. In order to secure the proper action by the rod 20, the same is preferably formed with a coil 24 between its intermediate portion and each end and this coil is so tensioned that the ends of the rod resiliently urge the ends of the guard upwardly against the floor.

From the foregoing description it will be seen that I have devised a simple and inexpensive guard which may be readily and quickly attached and which will always effectively close the slot in which the lever operates. While I have shown one specific structure by means of which the invention may be embodied, it will be readily seen that various modifications may be made therein within the scope of what is claimed. It will, also, be understood that the invention is not limited in its application to any specific form of lever, but may be readily applied to any lever which extends through and operates in a slot.

I claim:—

1. A slot guard adapted to be secured to an automobile lever underneath the floor and comprising a strip of sheet metal with a portion cut out to receive the lever, a strip for closing the cut out portion after the lever has been inserted, complementary flanges on the strips, means for clamping the flanges to the lever, and means resiliently urging the ends of the guard toward the floor in all positions of the lever.

2. A device of the character described comprising a strip of sheet metal substantially rectangular in shape but with a portion cut out from one side intermediate its ends, a closure strip for covering the cut out portion, complementary reinforced flanges formed on the strips, means for clamping the same to a lever around which the strips have been placed, a resilient rod intermediately secured to the first mentioned strip with its ends slidably engaging the same, coils being formed in the rod between its secured portion and its respective ends and tensioned so as to urge the ends of the strip against the floor.

In testimony that I claim the foregoing I have hereunto set my hand at Milwaukee, in the county of Milwaukee and State of Wisconsin.

CHARLES H. GAULKE.